Sept. 6, 1932.  P. W. LEHMAN  1,876,251
DUSTING MACHINE
Filed April 10, 1930   3 Sheets-Sheet 3

INVENTOR.
Paul W. Lehman
BY
ATTORNEY.

Patented Sept. 6, 1932

1,876,251

UNITED STATES PATENT OFFICE

PAUL W. LEHMAN, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

DUSTING MACHINE

Application filed April 10, 1930. Serial No. 443,126.

My invention relates to an apparatus for dusting uncured rubber articles with some form of powdered lubricant to prevent sticking of the articles to the mold during vulcanization. It is among the objects of my invention to provide an apparatus of this character adapted for continuous production, and so constructed as to prevent escape of the powder into the work room, thus protecting the health of the workmen and at the same time effecting a saving in powder. A still further object is to provide an apparatus which will apply a uniform film of powder of the desired density, thus realizing a still further saving in powder over some of the present methods of application.

In the drawings I have shown an apparatus embodying my invention which is adapted to dust pneumatic tire carcasses built on semi-flat drums.

Referring to the drawings.

Figure 1:
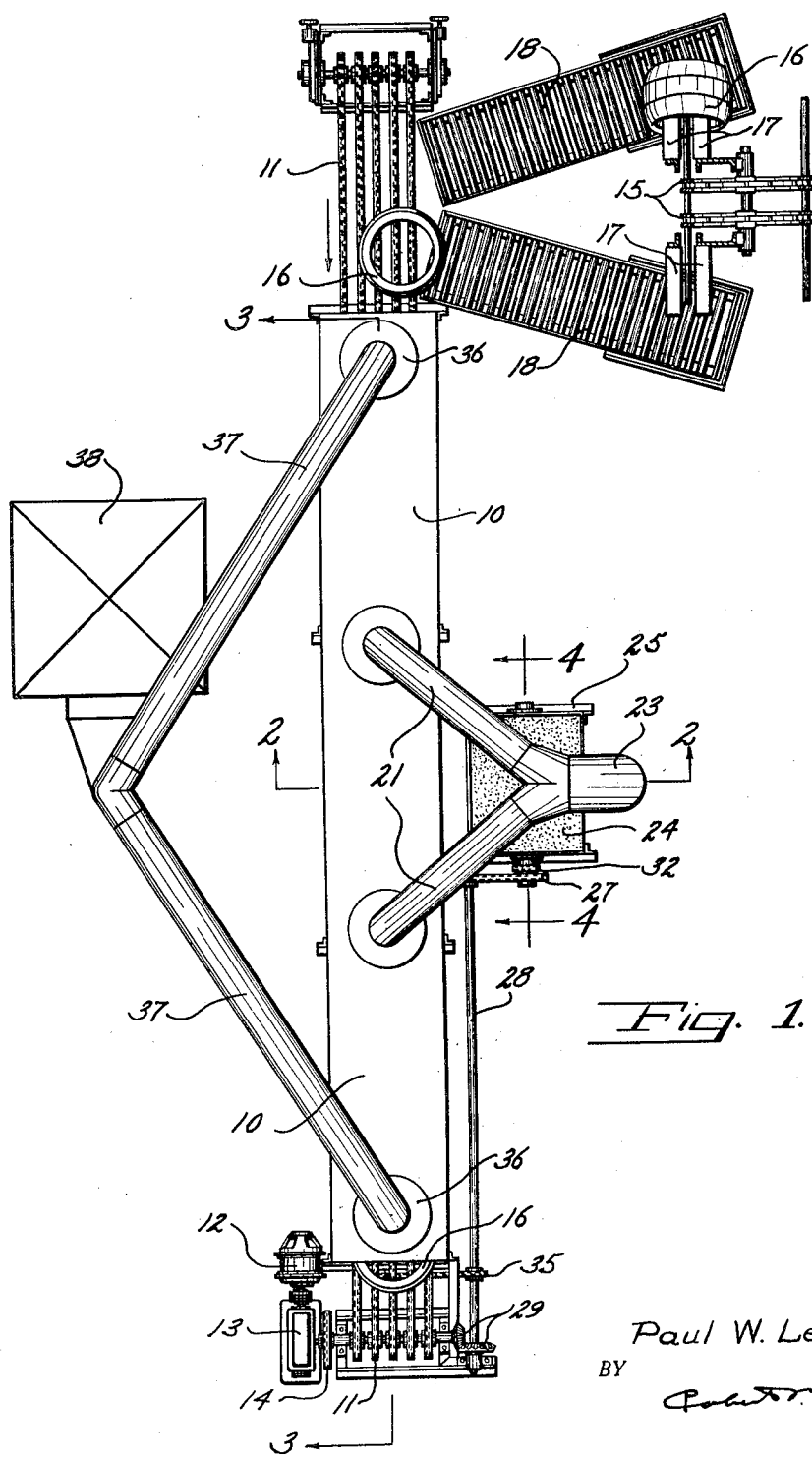
Fig. 1 is a plan view of an apparatus embodying my invention, showing one way in which it may be used for continuous production.

As shown in the drawings, 10 indicates an elongated chamber or tunnel through which passes a conveyor 11 driven in the direction indicated by the arrow in Fig. 1 by an electric motor 12 operating through a reduction unit 13 and a chain drive 14. The tires 16 to be dusted may be deposited on the conveyor 11 by hand or any suitable means, that shown in Fig. 1 comprising a conventional vertical conveyor 15, knockout cams 17 being provided to discharge the casings 16 from the conveyor 15 to gravity roller conveyors 18 which in turn deposit the casings on the chain conveyor 11.

Figure 2:
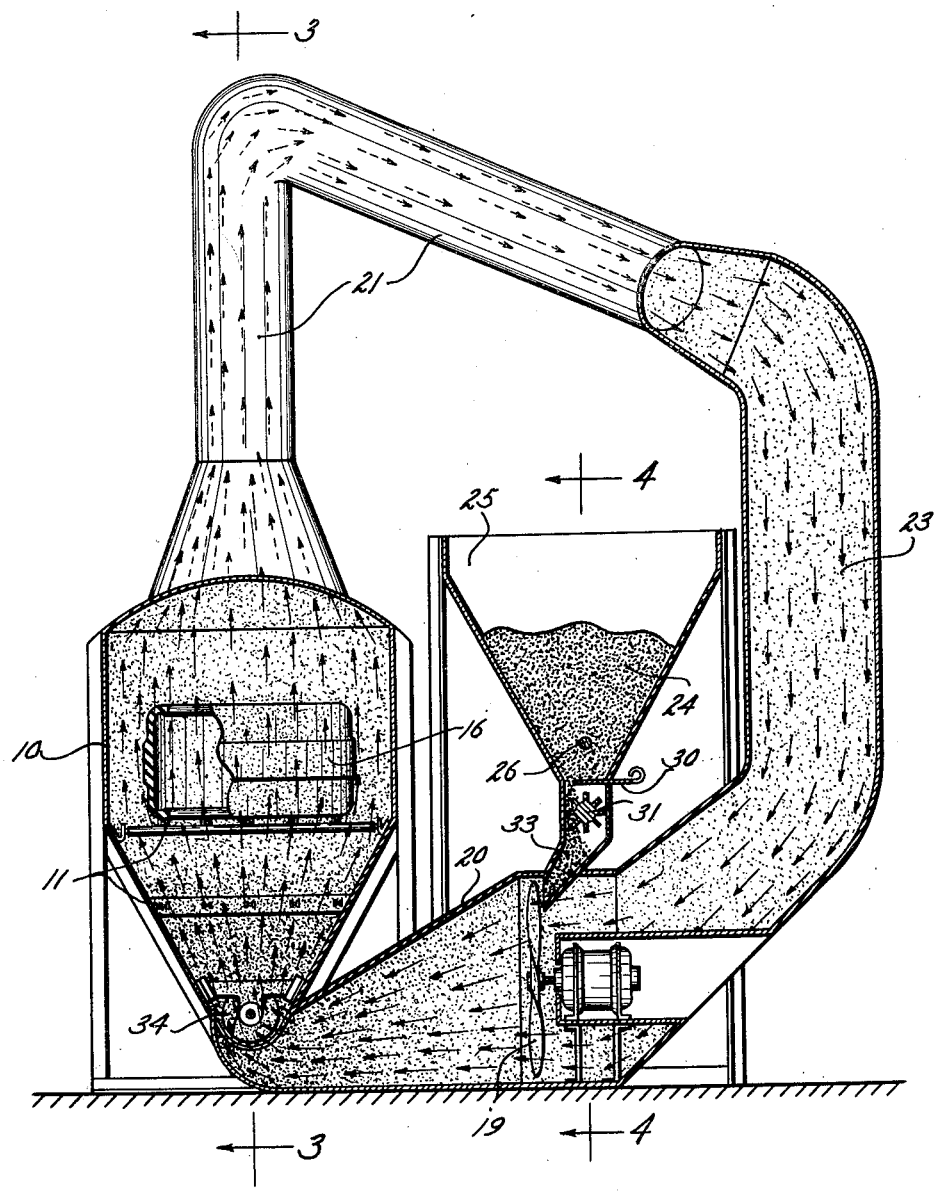
Fig. 2 is a sectional view on a larger scale, taken on line 2—2 of Fig. 1.
Figure 3:
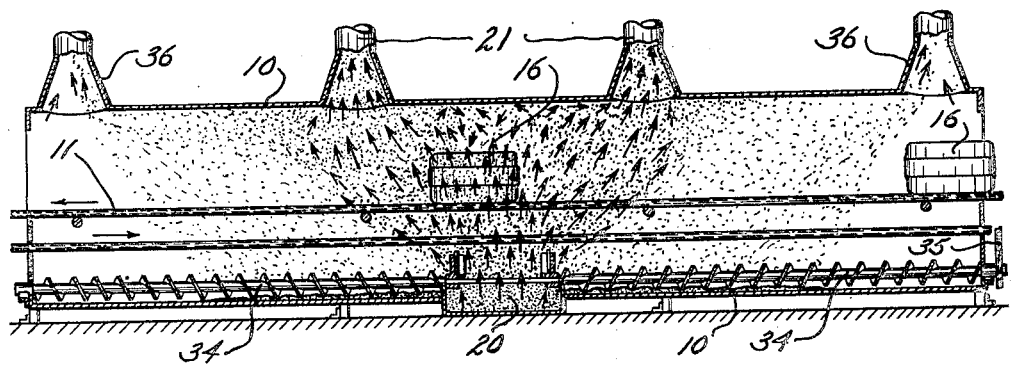
Fig. 3 is a sectional view taken on line 3—3 of Figs. 1 and 2.

As best shown in Figs. 2 and 3 a duct 20, in which is positioned a blower 19, opens into the tunnel 10 at substantially its midpoint and beneath conveyor 11. Opening from the top of the tunnel 10 and substantially equally spaced from the opening of duct 20 I provide ducts 21 which lead to a common return duct 23 completing the circuit back to the blower.

Figure 4:
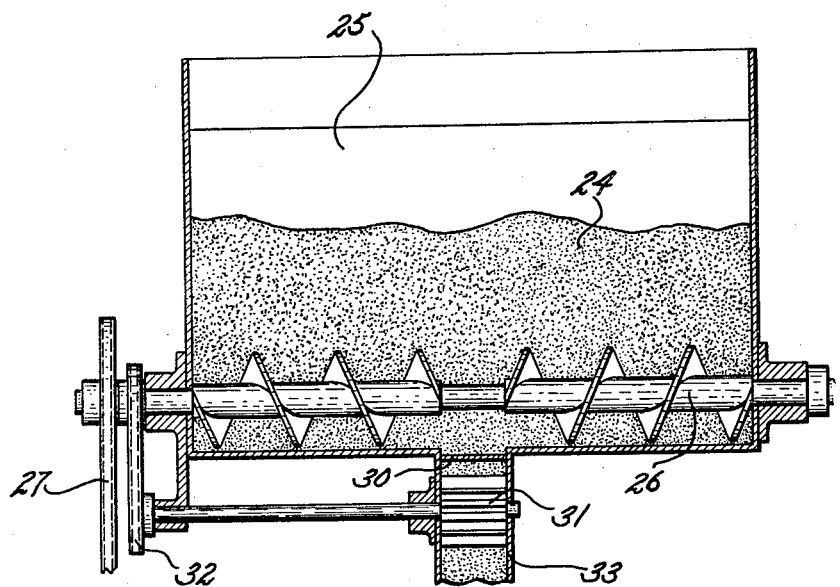
Fig. 4 is a sectional view taken on line 4—4 of Figs. 1 and 2.

Powdered lubricant 24, which is to be applied to the casings 16, is stored in a hopper 25 at the bottom of which is a feed screw 26 (Fig. 4) driven through a chain drive 27, shaft 28 and bevel gears 29, thus tying into the drive for conveyor 11.

A gate 30 is provided at the bottom of the hopper 25 so as to regulate the flow of the powder 24. A rotating agitator wheel 31 is positioned below the gate and is driven by a chain drive 32 connected to the feed screw 26. A duct 33 leads from the agitator wheel to the back of the blower 19 and, as will be readily seen, the introduction of powder at this point will cause the powder to be carried along in the air stream, thus forming a cloud of the powder in the tunnel, the density of which may be controlled by the gate 30. When the casings 16 on the chain conveyor 11 pass through the cloud of powder they acquire the desired thin film of powder, the depth of which is governed by the density of the cloud.

The main course of the air stream created by the blower is generally indicated by the arrows in Figs. 2 and 3 and, as best shown in Fig. 3, the center portion of the current from the opening 20 impinging against the top of the tunnel causes a turbulence at this point eventually passing with the remainder of the current through the spaced openings 21. This arrangement assures the creation of a dust cloud of substantial volume and yet of uniform density.

As best shown in Fig. 3, the bottom of the tunnel is equipped with a double feed screw 34 driven by a chain drive 35 from shaft 28. This functions to collect any powder that settles at the bottom of the tunnel and carry it back into the air stream. In order to keep any dust from escaping into the room from the open ends of the tunnel, I have provided suction hoods 36 connected by ducts 37 to a collector 38 which may be of any suitable kind, the details of which have not been shown in the drawings.

It can be seen from the foregoing that, as the casings 16 are carried through the tunnel on the conveyor 11, they acquire a film of the powdered lubricant of the desired density and all the excess powder is saved for further use, none of it escaping into the room. It will be understood that my invention is not limited to the dusting of tire casings.

Having thus described my invention, I claim:

1. A device of the character described which comprises an elongated chamber, a conveyor passing longitudinally through the chamber, a pair of spaced ducts opening from the top of the center portion of the chamber, said spaced ducts leading to a common return duct opening into the bottom of the chamber at a point below the conveyor and between the openings of the spaced ducts, a blower in said return duct and means to feed powdered lubricant to the blower.

2. A device of the character described which comprises an elongated chamber, a conveyor passing longitudinally through the chamber, a pair of spaced ducts opening from the top of the center portion of the chamber, said spaced ducts leading to a common return duct opening into the bottom of the chamber at a point below the conveyor and between the openings of the spaced ducts, a blower in said return duct, means to feed powdered lubricant to the blower and means to return to the opening of the return duct such lubricant as may settle to the bottom of the chamber.

3. A device of the character described which comprises an elongated chamber, a conveyor passing longitudinally through the chamber, a pair of spaced ducts opening from the top of the center portion of the chamber, said spaced ducts leading to a common return duct opening into the bottom of the chamber at a point below the conveyor and between the openings of the spaced ducts, a blower in said return duct, means to feed powdered lubricant to the blower, means to return to the opening of the return duct such lubricant as may settle to the bottom of the chamber, and a dust collector having openings adjacent each end of the chamber to prevent escape of lubricant from the chamber.

PAUL W. LEHMAN.